(12) United States Patent
Fukuzawa

(10) Patent No.: US 6,995,878 B2
(45) Date of Patent: Feb. 7, 2006

(54) IMAGE READING APPARATUS

(75) Inventor: Nobumasa Fukuzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 848 days.

(21) Appl. No.: 10/010,047

(22) Filed: Dec. 4, 2001

(65) Prior Publication Data
US 2002/0067516 A1    Jun. 6, 2002

(30) Foreign Application Priority Data
Dec. 6, 2000   (JP) .............................. 2000-372048

(51) Int. Cl.
H04N 2/04        (2006.01)
(52) U.S. Cl. ...................... 358/474; 358/497; 358/496; 358/509; 358/495
(58) Field of Classification Search ................ 358/474, 358/497, 496, 498, 495, 509
See application file for complete search history.

(56) References Cited

U.S. PATENT DOCUMENTS 5,734,483 A * 3/1998 Itoh ........................... 358/496
5,734,758 A * 3/1998 Yamamoto et al. ......... 382/274
5,912,747 A * 6/1999 Murakami ................... 358/497
6,646,768 B1 * 11/2003 Andersen et al. ........... 358/474
6,891,547 B2 * 5/2005 Kang et al. .................. 345/555

* cited by examiner

Primary Examiner—Kimberly Williams
Assistant Examiner—Negussie Worku
(74) Attorney, Agent, or Firm—Morgan & Finnegan, LLP

(57) ABSTRACT

The object of this invention is to read an image (scan flow), when an original is being moved, above a scan flow glass member, so as to prevent degradation in image caused by dust or a scar on a scan flow glass. In order to achieve this object, the original which is being moved is illuminated by an illumination system comprised of an illumination light source and reflecting member and different from an illumination system in a reading apparatus body and comprised of an illumination light source and reflecting member. After a reflected light beam passes through a slit and the scan flow glass member, it forms an image on a line sensor, e.g., a CCD, by an imaging lens through a movable mirror. As the original moves at a constant speed, it is read by the line sensor, e.g., a CCD, at a predetermined timing, thereby obtaining image information of the original. The original is located above the scan flow glass member. Even if dust or a scar of about several tens μm is present on the scan flow glass member, it goes out of focus, so it can be prevented from forming an absent point of the line sensor such as a CCD.

5 Claims, 4 Drawing Sheets

IMAGE READING APPARATUS

FIELD OF THE INVENTION

The present invention relates to an image reading apparatus and, more particularly, to an image reading apparatus having two different reading systems, i.e., a reading system in which an original is fixed on an original glass plate and an optical system scans it to read image information, and a reading system in which an optical system is fixed and an original is moved so image information is read from it.

BACKGROUND OF THE INVENTION

A conventional image reading apparatus has two different reading systems, i.e., a reading system in which an original is fixed on an original glass plate and an optical system scans it to read image information, and a reading system in which an optical system is fixed and an original is moved so image information is read from it.

FIG. 3 is a view showing the arrangement of a conventional image reading apparatus, and shows a reading system in which an optical system is fixed and image information of an original 120 is read while the original 120 is conveyed by a DF (abbreviation for a document feeder), although not shown. The original 120 is moved by the DF. When the original 120 passes above a scan flow glass member 104, it is illuminated through a light source 106 and reflecting member 107. A light beam reflected by the original 120 is transmitted through a slit 108 and forms an image on a line sensor 113 such as a CCD by an imaging lens 112 through first, second, and third mirrors 109, 110, and 111. As the original 120 moves at a constant speed, the line sensor 113 such as a CCD reads it at a predetermined timing, so the image information of the original 120 can be read.

When an original 130 is placed on an original glass plate 101, while it is illuminated by the light source 106 and reflecting member 107 of an illuminating portion, the light source 106, reflecting member 107, slit 108, and first mirror 109 cooperate with each other to scan it in the subscanning direction indicated by an arrow X in FIG. 3. At the same time, the second and third mirrors 110 and 111 move in the subscanning direction indicated by the arrow X. Thus, the image information on the original 130 is read by the line sensor 113 such as a CCD.

When an image reading apparatus is formed with the above arrangement, an original such as a book, a thin original which is difficult to convey with the DF, or the like can be read if it is placed on the original glass plate 101. Simultaneously, a sheet-type original can be read while it is moved on the scan flow glass member 104. In particular, if the original can be read by the latter scan flow scheme, it can be read quietly because it is not scanned by an optical system, and can be read at a high speed.

In the prior art described above, the optical system is fixed and the original is read while being conveyed, that is, so-called scan flow operation is performed, so the advantages such as quietness and higher speed are realized. However, due to dust attaching to the scan flow glass member 104, or a scar on the glass plate itself, the following problems arise.

Currently, the above image reading apparatus generally has a reading density of about 400 dpi to 600 dpi. In this case, a pixel with a size of 63.5 µm is read at 400 dpi, and a pixel with a size of 42.3 µm is read at 600 dpi. When dust or a scar is present on the scan flow glass member 104, even if it is as very small as several tens µm, a streak is formed on a read image or a copy image formed from the read image because of the dust or scar described above.

Since the optical system is fixed, in the scan flow mode, the same one position on the scan flow glass member 104 is always read. When dust or a scar is present on this position, this problem also occurs.

With the ordinary original glass plate 101, even if dust or a scar is present on it, when a read image is formed or a copy image is formed from the read image, a single image degraded point of as small as several tens µm is merely formed. As described above, in the case of the scan flow mode, when dust or a scar is present at the reading position, it forms a streak from the leading edge to the trailing edge of the image, making the image very bad-looking. Accordingly, the image reading apparatus like that of the prior art is imposed a very heavy load in terms of the manufacture of the scan flow glass plate at the factory, management of dust or scar at the time of shipping, cleaning on the market, and the like.

SUMMARY OF THE INVENTION

The present invention has been made in consideration of the above problems, and has as its object to provide an image reading apparatus in which image reading (scan flow) while the original is being moved is performed above the scan flow glass member, so image degradation caused by dust or a scar on the scan flow glass member can be prevented.

In order to solve the above problems and to achieve the above object, an image reading apparatus according to the present invention has the following arrangement.

More specifically, there is provided an image reading apparatus comprising two different reading systems constituted by a reading system in which an original is fixed on an original glass plate and an optical system scans the original to read image information, and a reading system in which an optical system is fixed and image information is read while moving the original, wherein an original illumination system, different from an original illumination system that illuminates the original placed on the original glass plate, is arranged above a scan flow glass member arranged on substantially the same plane as that of the original glass plate and used when reading image information while moving the original, an original convey device is formed to move the original above the different original illumination system, the original which is being conveyed is directly illuminated by the different original illumination system, and switching means is provided for switching a focal surface of the original.

Namely, according to the present invention, an image reading apparatus is formed such that a position where a position where image information is read from an original in conveyance is set at position different from a position on the original glass plate, and that the original is read in midair. Since the position for reading the conveyed original is set above the scan flow glass member arranged on the same plane as that of the original glass plate, dust or a scar on the scan flow glass member, which conventionally poses a problem, goes out of focus. Thus, a streak is prevented from being formed on the read image. Also, since the original is read not through the glass plate immediately under it, it is not adversely affected by dust or scar.

According to the present invention, the focal surface of the optical system in the image reading apparatus can be moved. Simultaneously, an illumination system for illuminating the original in conveyance is separately provided in the DF. No glass member is arranged above another illumination system for illuminating this original, i.e., immediately under the original. The original is directly read in midair.

Other features and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The embodiments of the present invention will be described with reference to the accompanying drawings.

[First Embodiment]

Figure 1:
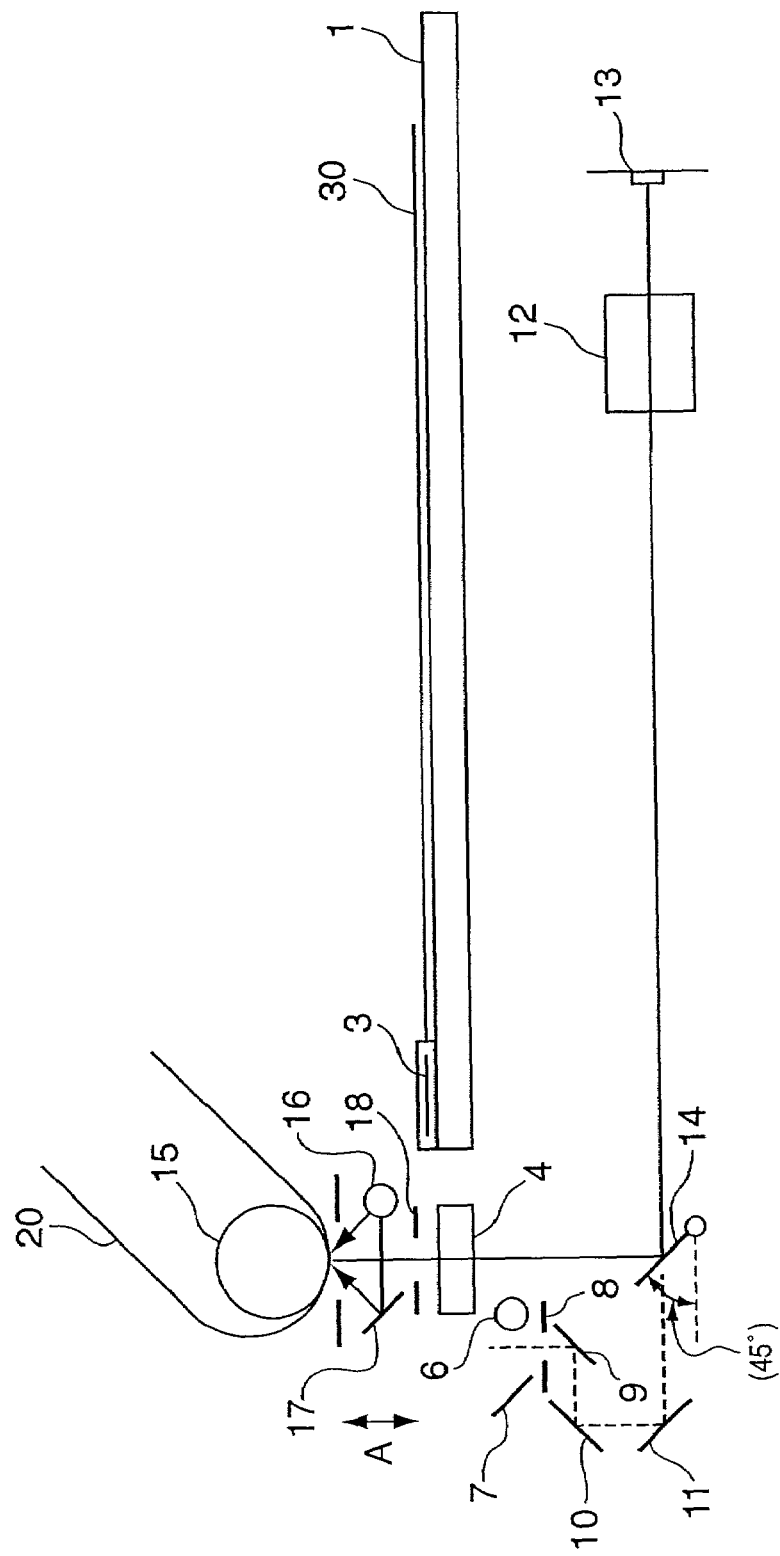
FIG. 1 is a view for explaining an image reading apparatus according to an embodiment of the present invention.

FIG. 1 is a view showing the arrangement of an image reading apparatus according to the first embodiment of the present invention. In this image reading apparatus, an original 20 conveyed by a convey roller 15 is illuminated by an illumination system comprised of an illumination light source 16 and reflecting member 17 and different from an illumination system in the reading apparatus body and comprised of an illumination light source 6 and reflecting member 7. After a light beam reflected by the original 20 passes through a slit 18 and scan flow glass member 4, it forms an image on a line sensor 13, e.g., a CCD, by an imaging lens 12 through a movable mirror 14.

A DF (Document Feeder; not shown) is formed such that the original 20 moves at a position which is about 20 mm to 50 mm above the scan flow glass member 4 with almost the same focal surface as that of an original glass plate 1.

Figure 3:
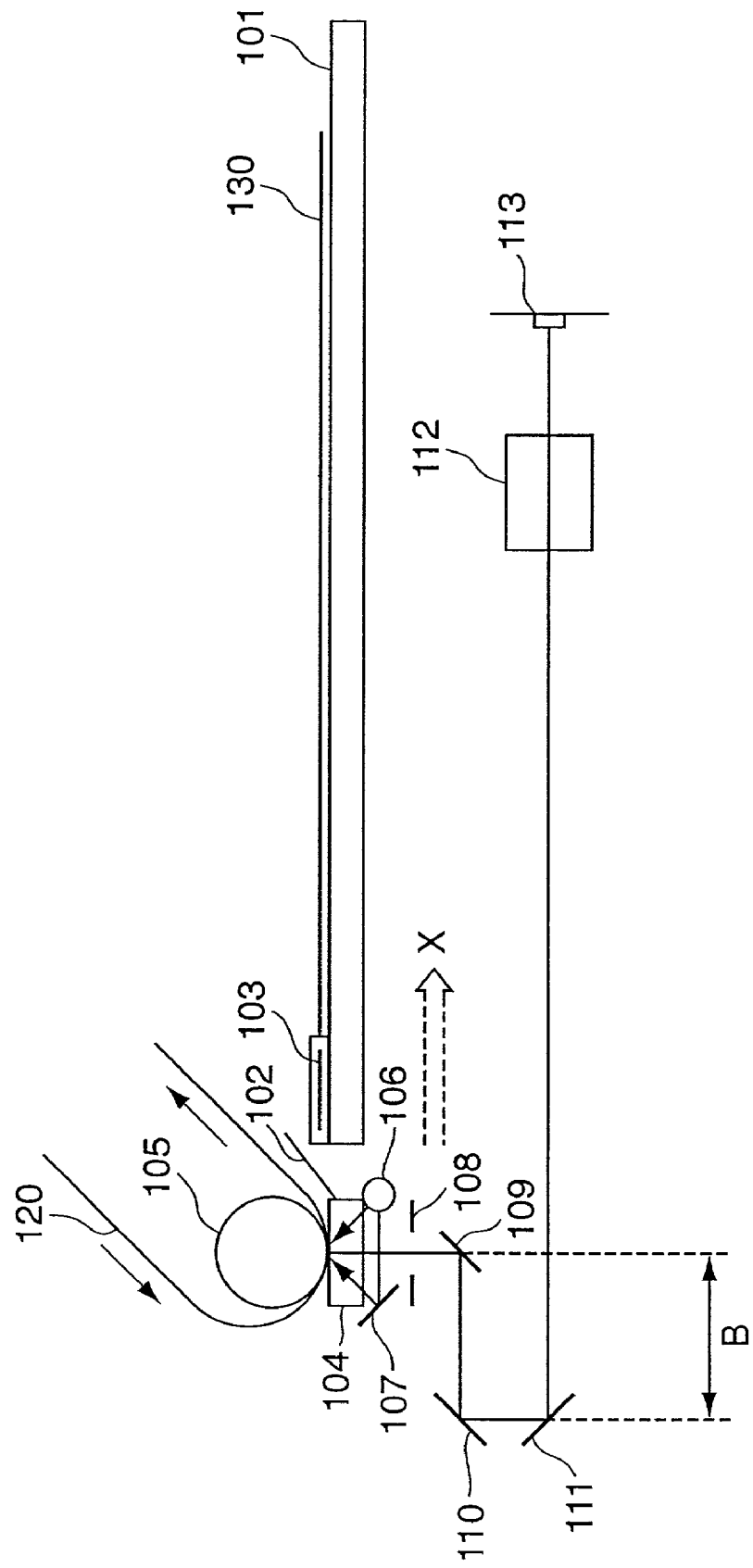
FIG. 3 is a view for explaining a conventional image reading apparatus.

In the illumination system in the image reading apparatus body, as shown in FIG. 3, when the original 20 passes above the scan flow glass member 4, it is illuminated through the illumination light source 6 and reflecting member 7, and the light beam reflected by the original 20 is transmitted through a slit 8 and forms an image on the line sensor 13, e.g., a CCD, by the imaging lens 12 through first, second, and third mirrors 9, 10, and 11.

In this arrangement, the original 20 which is being moved is illuminated by the illumination system comprised of the illumination light source 16 and reflecting member 17 and different from the illumination system in the reading apparatus body and comprised of the illumination light source 6 and reflecting member 7. After a light beam reflected by the original 20 passes through the slit 18 and scan flow glass member 4, it forms an image on the line sensor 13, e.g., a CCD, by the imaging lens 12 through the movable mirror 14. As the original 20 moves at a constant speed, it is read by the line sensor 13, e.g., a CCD, at a predetermined timing, thereby obtaining the image information of the original 20.

Figure 4:
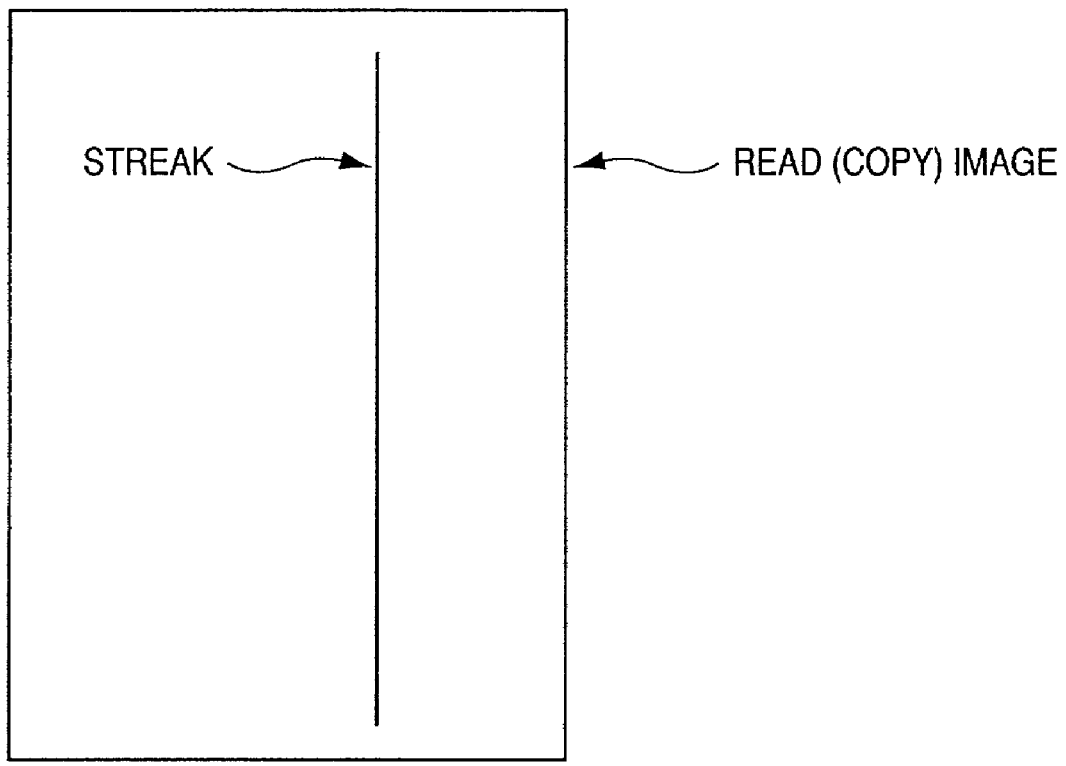
FIG. 4 is a view showing an example of an image that poses a problem in the prior art.

As described above, the original 20 is located, e.g., about 20 mm to 50 mm above the scan flow glass member 4. Even if dust or a scar of about several tens $\mu$m is present on the scan flow glass member 4, it goes out of focus as it is away from the focal surface by about 20 mm to 50 mm, so it can be prevented from forming an absent point of the line sensor 13 such as a CCD. Therefore, the problem of a streak as shown in FIG. 4, which occurs in a read image or in a copy image formed from the read image, can be solved.

A mechanism for changing the focal surface to above the scan flow glass member 4 will be described. As shown in FIG. 1, the so-called first mirror table in the image reading apparatus body and comprised of the illumination light source 6, reflecting member 7, slit 8, and first mirror 9 for reading an original 30 placed on the original glass plate 1 by scanning it in the subscanning direction, and the so-called second mirror table comprised of the second mirror 10 and third mirror 11 are moved to the left end in the image reading apparatus body.

Subsequently, the movable mirror 14 is raised (usually, retreated to a position not interfering with the scanning optical system) as shown in FIG. 1. Hence, the focal surface moves upward from the scan flow glass member 4 by a distance A which is twice that between the first and second mirrors 9 and 10 corresponding to the scan flow position, e.g., a distance B shown in FIG. 3, i.e., a distance 2B. In this embodiment, the optical system is arranged in the optimal manner so that A (about 20 mm to 50 mm)=2B.

The focal surface is moved by about 20 mm to 50 mm. For example, in an image reading apparatus that reads an image with an original size of A3, the optical path length from the original glass plate 1 to the line sensor 13 such as a CCD is usually about 500 mm to 600 mm. When the focal surface is moved by about 20 mm to 50 mm, dust or a scar with a size of about several tens $\mu$m can be set out of focus sufficiently, and is not recognized as an image signal.

[Second Embodiment]

Figure 2:
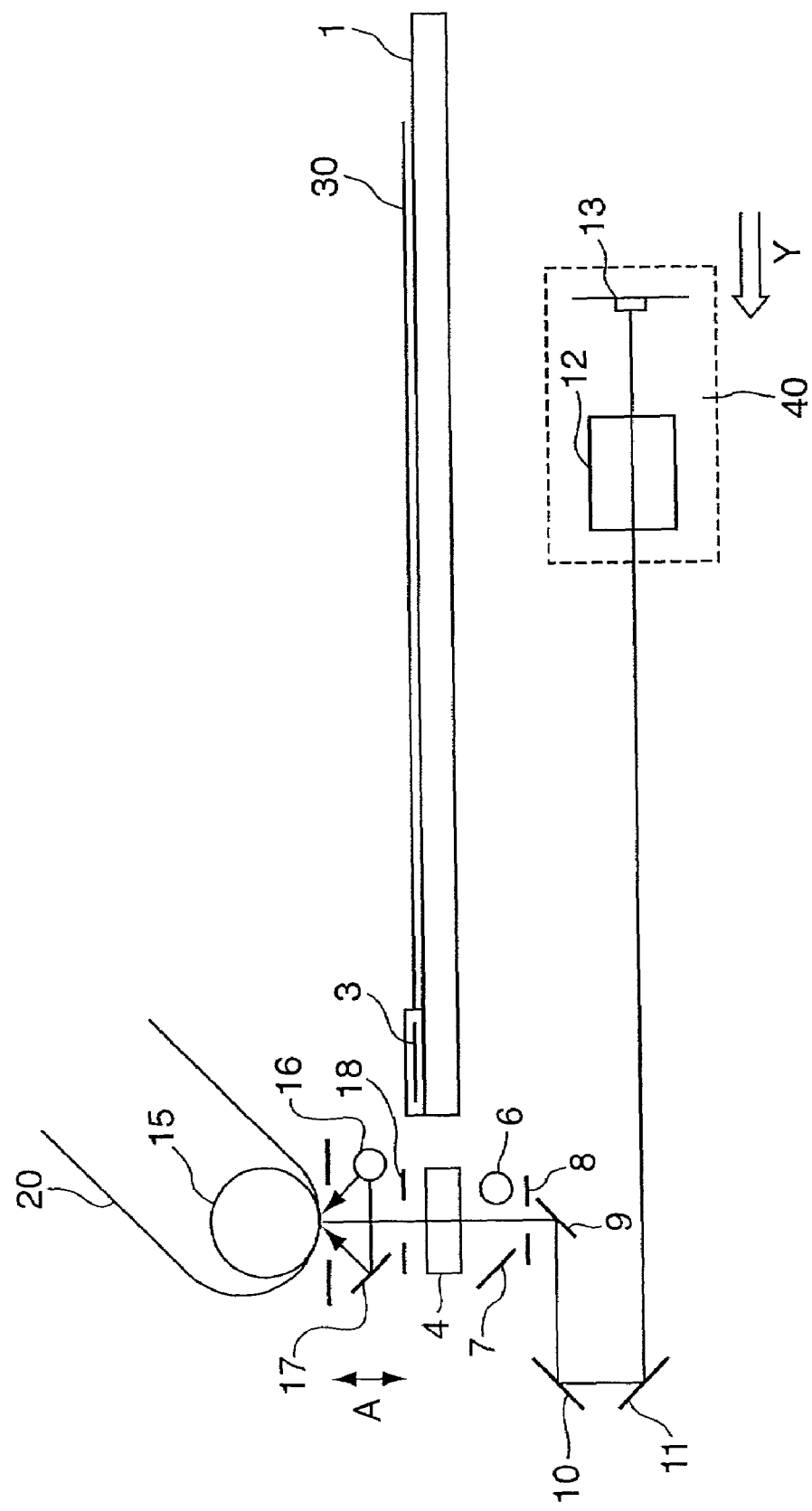
FIG. 2 is a view for explaining another embodiment of the present invention.

According to another embodiment, as shown in FIG. 2, an imaging lens 12 and a line sensor 13, e.g., a CCD, are integrated as a unit 40. The integrated unit 40 is moved with, e.g., a motor (not shown), in a direction Y by a distance A, so the focal surface moves upward from a scan flow glass member 4 by a distance A. An image is read while moving an original 20 in the same manner as that described above. Thus, an adverse effect of dust or a scar on the scan flow glass member 4 can be prevented.

As has been described above, according to the above embodiments, an original illumination system, different from an original illumination system that illuminates the original placed on the original glass plate, is arranged above another original glass plate arranged on substantially the same plane as that of the original glass plate and used when reading image information while moving the original, an original convey device is formed to move the original above the different original illumination system, the original which is being conveyed is directly illuminated by the different original illumination system, and switching means is provided for switching a focal surface of the original. Image reading (scan flow) from the original which is being moved is performed above the scan flow glass member. Thus, degradation in image caused by dust or a scar on the scan flow glass member can be prevented.

The present invention is not limited to the above embodiments and various changes and modifications can be made within the spirit and scope of the present invention. Therefore, to apprise the public of the scope of the present invention the following claims are made.

What is claimed is:

1. An image reading apparatus comprising two different reading systems constituted by a first reading system in which an original is fixed on an original plate and an optical system scans the original to read image information, and a second reading system in which an optical system is fixed and image information is read while moving the original, wherein
 a second original illumination system, different from a first original illumination system that illuminates the original placed on the original plate, is arranged above a scan flow member used when reading image information while moving the original, an original convey device is formed to move the original above said second original illumination system, and
 wherein a focal surface of the original fixed on the original plate is positioned below said second original illumination system in a direction of an optical axis of said second original illumination system, and a focal surface of the original conveyed by the original convey device is positioned above the second original illumination system in the direction of the optical axis of said second original illumination system.

2. The apparatus according to claim 1, further comprising switching means that switches the focal surface of the original fixed on the original plate and the focal surface of the original conveyed by the original convey device.

3. The apparatus according to claim 1, wherein said switching means switches the focal surface by retreating said optical system that scans the original placed on said original glass plate and inserting a movable mirror in an optical path.

4. The apparatus according to claim 1, wherein said switching means integrates an imaging lens and line sensor to form a unit, and moves the unit in a direction of optical axis, thereby switching the focal surface.

5. An image reading apparatus comprising two different reading systems constituted by a first reading system in which an original is fixed on an original plate and image information is read while moving a first optical system, and a second reading system in which a second optical system is fixed and image information is read while moving the original, wherein
 a position of a focal surface of the original fixed onto original plate and a position of a focal surface of the original conveyed by an original convey device are different in a direction of an optical axis of said second reading system.

* * * * *